US007605858B2

(12) United States Patent
Harada

(10) Patent No.: US 7,605,858 B2
(45) Date of Patent: Oct. 20, 2009

(54) IMAGE CAPTURING APPARATUS, CONTROL METHOD THEREOF, AND PROGRAM

(75) Inventor: Osamu Harada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 11/463,653

(22) Filed: Aug. 10, 2006

(65) Prior Publication Data

US 2007/0052823 A1 Mar. 8, 2007

(30) Foreign Application Priority Data

Aug. 16, 2005 (JP) ............................. 2005-235948

(51) Int. Cl.
*G02B 13/16* (2006.01)

(52) U.S. Cl. ....................................... 348/335; 359/512

(58) Field of Classification Search ................... 348/81, 348/180, 187, 340, 335; 359/512
See application file for complete search history.

(56) References Cited

U.S. PATENT DOCUMENTS

2004/0200027 A1* 10/2004 Sugihara ...................... 15/301
2004/0223074 A1* 11/2004 Takada ....................... 348/360
2005/0094994 A1* 5/2005 Paolantonio et al. ........ 396/427

FOREIGN PATENT DOCUMENTS

JP 07151946 A * 6/1995
JP 2002-204379 7/2002

* cited by examiner

*Primary Examiner*—David L Ometz
*Assistant Examiner*—Akshay Trehan
(74) *Attorney, Agent, or Firm*—Canon U.S.A., Inc., IP Division

(57) ABSTRACT

An image capturing apparatus includes an image capturing unit which converts an optical image of an object into an electrical signal, and an optical member arranged on the object side of the image capturing unit. The image capturing apparatus also includes an alien substance removing unit configured to execute an alien substance removal operation to remove alien substances adhering to the surface of the optical member, an environmental condition detection unit configured to detect the environmental condition around the image capturing unit or around the optical member, and a control unit configured to control the alien substance removal operation on the basis of the detected environmental condition.

9 Claims, 7 Drawing Sheets

IMAGE CAPTURING APPARATUS, CONTROL METHOD THEREOF, AND PROGRAM

BACKGROUND OF THE INVENTION

1. Field of the Invention

The present invention generally relates to an image capturing apparatus, control method thereof, and program and, more particularly, to an image capturing apparatus having a function of removing alien substances adhering to a surface of an optical member, a control method thereof, and a program.

2. Description of the Related Art

Conventionally, an image capturing apparatus comprising an image capturing unit to execute photography and a photographic lens detachable from its main body has been known. In such an image capturing apparatus, when a photographic lens is detached, alien substances such as dirt or dust can readily adhere to the surface of an image capturing unit accommodated in the image capturing apparatus. When an alien substance adheres to the surface of the image capturing unit, a black shadow appears in a captured image, resulting in a partially defective object image. This leads to degradation in image quality of the captured image. To remove the alien substances adhering to the surface of the image capturing unit, users have to clean the surface of the image capturing unit.

In recent years, an image capturing apparatus having an alien substance removing function is also known. This alien substance removing function works by vibrating the member of the surface of an image capturing unit to automatically remove alien substances adhering to the image capturing unit. Japanese Patent Application Laid-Open No. 2002-204379 discloses an example of an image capturing apparatus having such an alien substance removing function. In this image capturing apparatus, the above-described alien substance removing function works at the time of, for example, activation so as to automatically remove alien substances on the surface of the image capturing unit.

Unfortunately, in the image capturing apparatus disclosed in Japanese Patent Application Laid-Open No. 2002-204379, the alien substances adhering to the surface of the image capturing unit absorbs moisture if, for example, the humidity around the image capturing unit is high or if dew condenses on the surface of the image capturing unit. As a result, the adhesion strength of the alien substances to the image capturing unit increases. This sometimes makes it very difficult to remove the alien substances even by executing an alien substance removal operation.

Still worse, even though the alien substances cannot be removed, users may mistakenly consider that the alien substances adhering to the image capturing unit has been properly removed. In this case, the users may start photography even though the alien substances are adhering to the image capturing unit.

SUMMARY OF THE INVENTION

It is an object of the present invention to provide an image capturing apparatus which can appropriately remove alien substances adhering to a surface of an optical member arranged on an object side in accordance with an environmental condition around it, a control method thereof, and a program.

The foregoing object can be achieved by providing an image capturing apparatus including an image capturing unit which converts an optical image of an object into an electrical signal, and an optical member arranged on the object side of the image capturing unit, comprising an alien substance removing unit configured to execute an alien substance removal operation to remove alien substances adhering to a surface of the optical member, an environmental condition detection unit configured to detect an environmental condition around the image capturing unit or around the optical member, and a control unit configured to control the alien substance removal operation on the basis of the detected environmental condition.

The foregoing object can also be achieved by providing a method of controlling an image capturing apparatus including an image capturing unit which converts an optical image of an object into an electrical signal, and an optical member arranged on the object side of the image capturing unit, comprising an alien substance removing step of executing an alien substance removal operation to remove alien substances adhering to a surface of the optical member, an environmental condition detection step of detecting an environmental condition around the image capturing unit or around the optical member, and a control step of controlling the alien substance removal operation on the basis of the detected environmental condition.

The foregoing object can also be achieved by providing a program stored in a computer-readable storage medium, which can be executed by an image capturing apparatus including an image capturing unit which converts an optical image of an object into an electrical signal, and an optical member arranged on the object side of the image capturing unit, comprising program codes for executing an alien substance removal operation to remove alien substances adhering to a surface of the optical member, detecting an environmental condition around the image capturing unit or around the optical member, and controlling the alien substance removal operation on the basis of the detected environmental condition.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate preferred embodiments of the invention and, together with the description, serve to explain the principles of the invention.

DESCRIPTION OF THE EMBODIMENTS

Preferred embodiments of the present invention will be described in detail below with reference to the accompanying drawings.

First Embodiment

Figure 1:
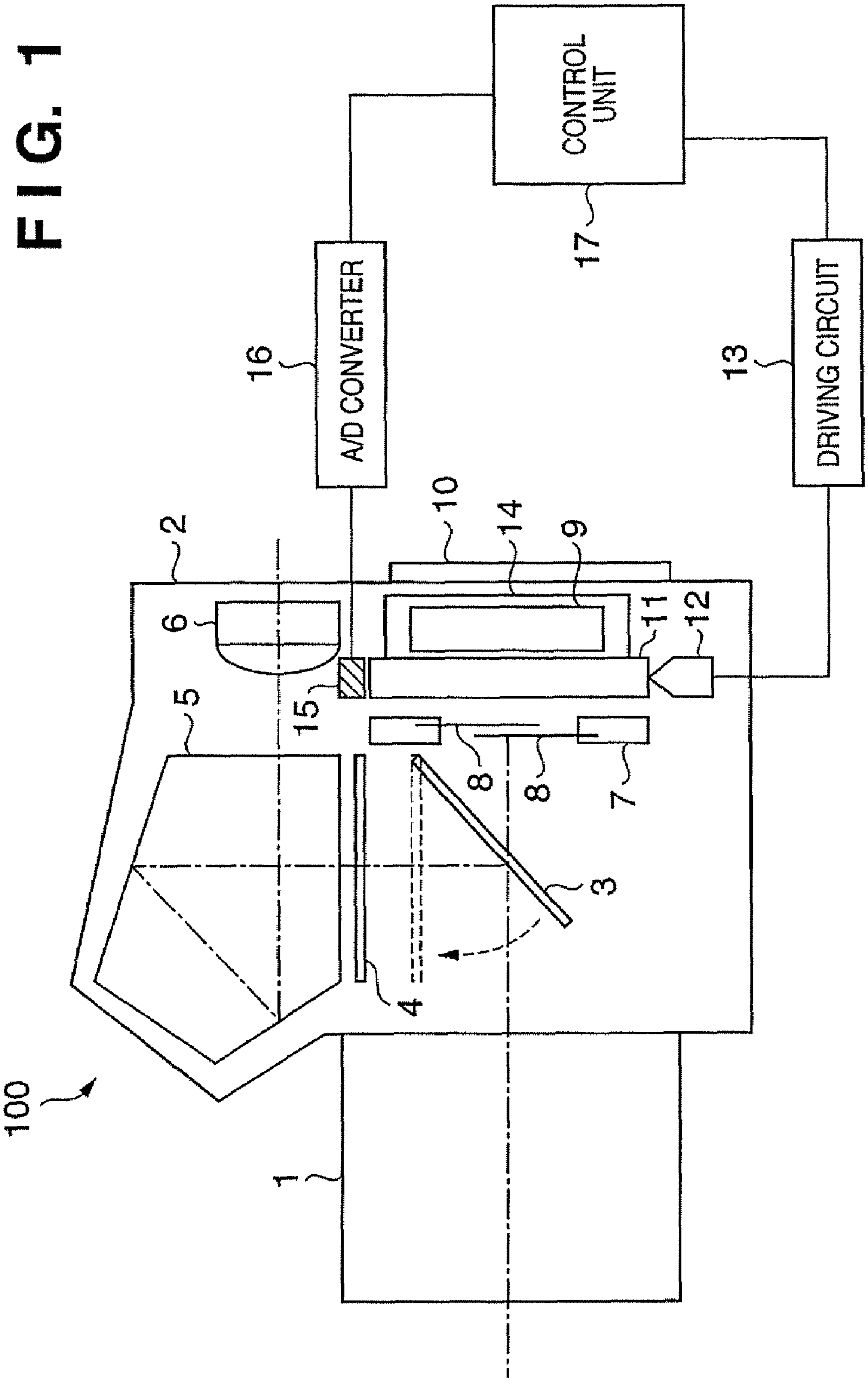
FIG. 1 is a schematic view showing the internal arrangement of an image capturing apparatus according to the preferred first embodiment of the present invention.

FIG. 1 is a schematic view showing the internal arrangement of an image capturing apparatus according to the preferred first embodiment of the present invention.

Referring to FIG. 1, a digital camera 100 serving as the image capturing apparatus according to the preferred embodiment of the present invention comprises a photographic lens 1 and camera main body 2. The photographic lens 1 is detachable from the camera main body 2.

The camera main body 2 comprises a mirror 3, a focusing screen 4, a prism 5, an eyepiece 6, shutters 7, shutter blades 8, an image sensor 9, and a display 10. The camera main body 2 also comprises a glass plate 11, a vibration unit 12, a driving circuit 13, a holder 14, a humidity sensor 15, an A/D converter 16, and a control unit 17.

The vibration unit 12 is connected to the control unit 17 via the driving circuit 13. The humidity sensor 15 is connected to the control unit 17 via the A/D converter 16.

Light coming through the photographic lens 1 is reflected by the mirror 3 and an imaged is formed on the focusing screen 4 which is arranged on an expected image plane of the photographic lens 1. Through the prism 5 for changing a finder optical path and the eyepiece 6, the user can observe light information as the photographing target imaged on the focusing screen 4. At this time, the mirror 3 is arranged at the standby position (the position indicated by a solid line in FIG. 1).

When a release switch (not shown) prepared for the digital camera 100 is pressed, the mirror 3 moves to the photographing position (the position indicated by a broken line in FIG. 1) to cause a driving circuit (not shown) to open the shutter blades 8 for a predetermined time. At this time, the image sensor 9 converts the light information as the photographing target imaged by the photographic lens 1 into electric signals.

The image sensor 9 is held by the holder 14. The glass plate 11 covers an opening portion of the holder 14 to protect the surface of the image sensor 9. The glass plate 11 also prevents alien substances from adhering to the surface of the image sensor 9 by sealing the holder 14. The image sensor 9, the glass plate 11, and the holder 14 is collectively referred to as an "image capturing unit" hereinafter.

The vibration unit 12 is formed from, for example, a piezoelectric substance to vibrate the glass plate 11. With this structure, the vibration unit 12 removes alien substances adhering to the surface of the glass plate 11. The operation for vibrating the glass plate 11 will be referred to as an "alien substance removal operation" hereinafter. The vibration unit 12 is schematically shown in FIG. 1. In practice, vibration units 12 are arranged on the periphery and the upper and lower sides.

The driving circuit 13 is controlled by the control unit 17 to apply a voltage having predetermined amplitude for a predetermined period to the vibration unit 12, thereby vibrating it. The display 10 displays, for example, a playback image, a photography menu and a warning message. The control unit 17 controls the overall operation of the digital camera 100. The humidity sensor 15 is arranged near the glass plate 11 to detect the humidity in the camera main body 2.

Figure 2:
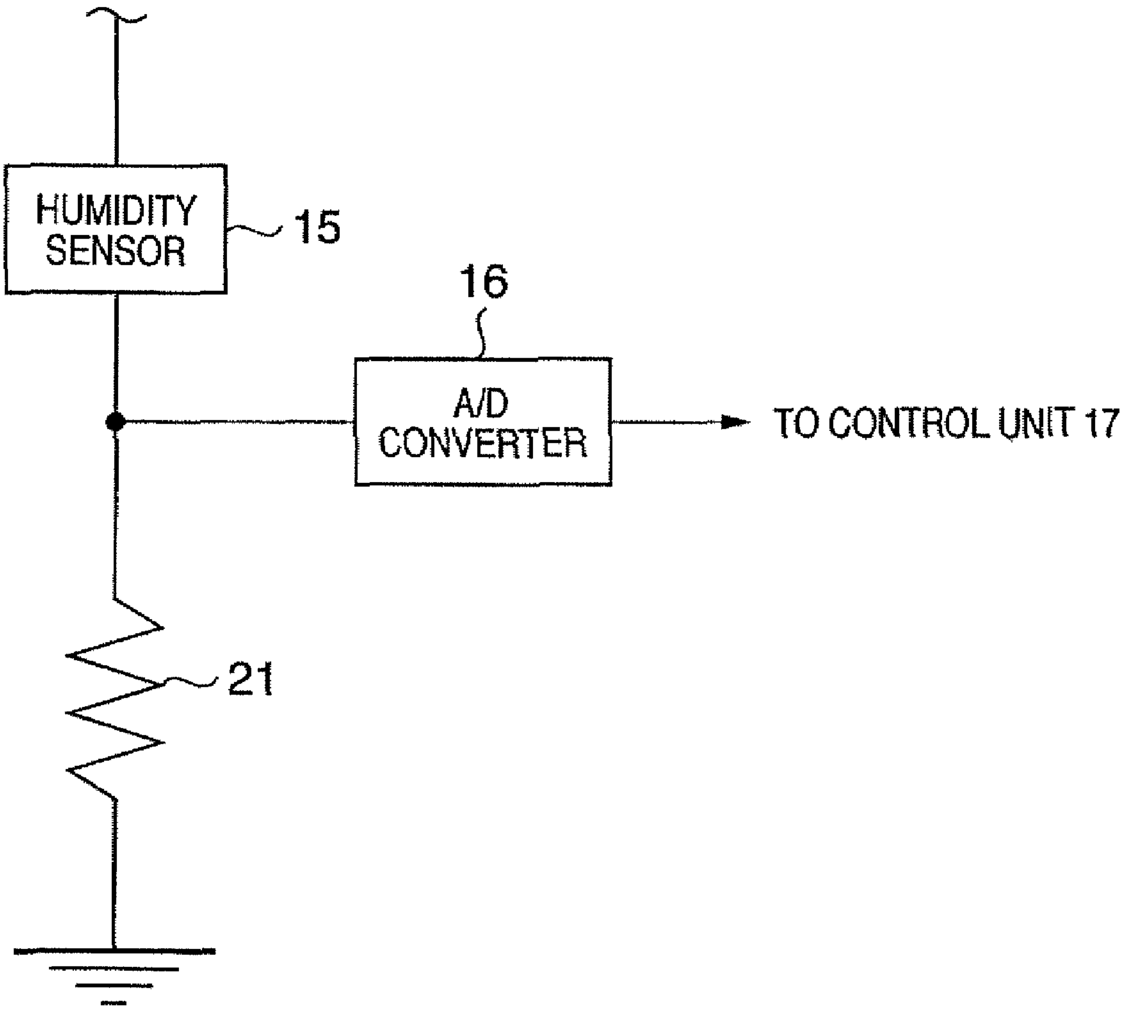
FIG. 2 is a block diagram showing an example of a peripheral circuit of a humidity sensor in FIG. 1.

FIG. 2 is a block diagram showing an example of a peripheral circuit of the humidity sensor 15 in FIG. 1.

Referring to FIG. 2, the humidity sensor 15 is connected in series with a resistor 21 in the circuit wherein a voltage is applied. The humidity sensor 15 detects the humidity in the camera main body 2 and outputs a resistance value corresponding to it. The A/D converter 16 A/D converts a voltage divided by the humidity sensor 15 and outputs, as the humidity in the camera main body 2, the resultant A/D conversion value to the control unit 17. The control unit 17 sets the amplitude of vibration to be applied to the vibration unit 12 according to the humidity of the camera main body 2.

Figure 3:
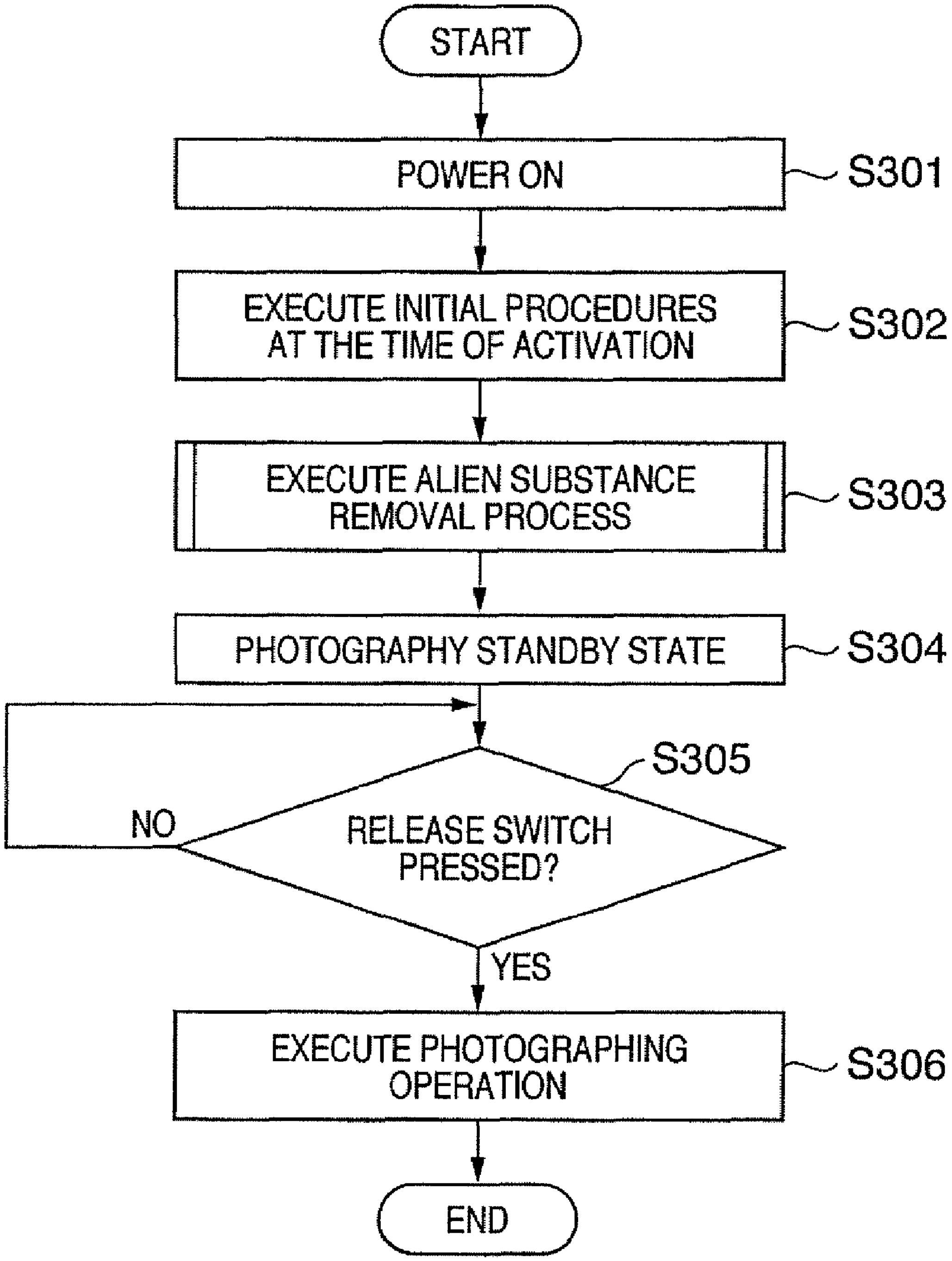
FIG. 3 is a flowchart showing the control processing procedure executed by a control unit in FIG. 1.

FIG. 3 is a flowchart showing the control processing procedure executed by the control unit 17 in FIG. 1.

Referring to FIG. 3, the control unit 17 powers on the digital camera 100 to activate it when a power supply switch (not shown) prepared for the digital camera 100 is pressed (step S301). The control unit 17 executes initial procedures at the time of activating the digital camera 100 (step S302). The initial procedures include confirmation of the power supply voltage level and abnormality of an SW system (not shown) prepared for the digital camera 100, confirmation of the presence/absence of a storage medium, attachment confirmation of the lens 1, and initial settings for photography.

The control unit 17 executes a process (to be referred to as an "alien substance removal process" hereinafter) required to implement the alien substance removal operation in FIG. 4 (to be described later) to remove alien substances adhering to the surface of the glass plate 11 of the image capturing unit (step S303). The digital camera 100 enters a photography standby state (step S304). At this time, the control unit 17 monitors a release switch (not shown) prepared for the digital camera 100 to determine whether it is pressed (step S305).

As a result of determination in step S305, if the release switch has not been pressed yet, the procedure returns to step S304 to maintain the photography standby state. If the release switch is pressed, the procedure advances to step S306. In step S306, the digital camera 100 executes a photographing operation. This process is thus terminated.

Figure 4:
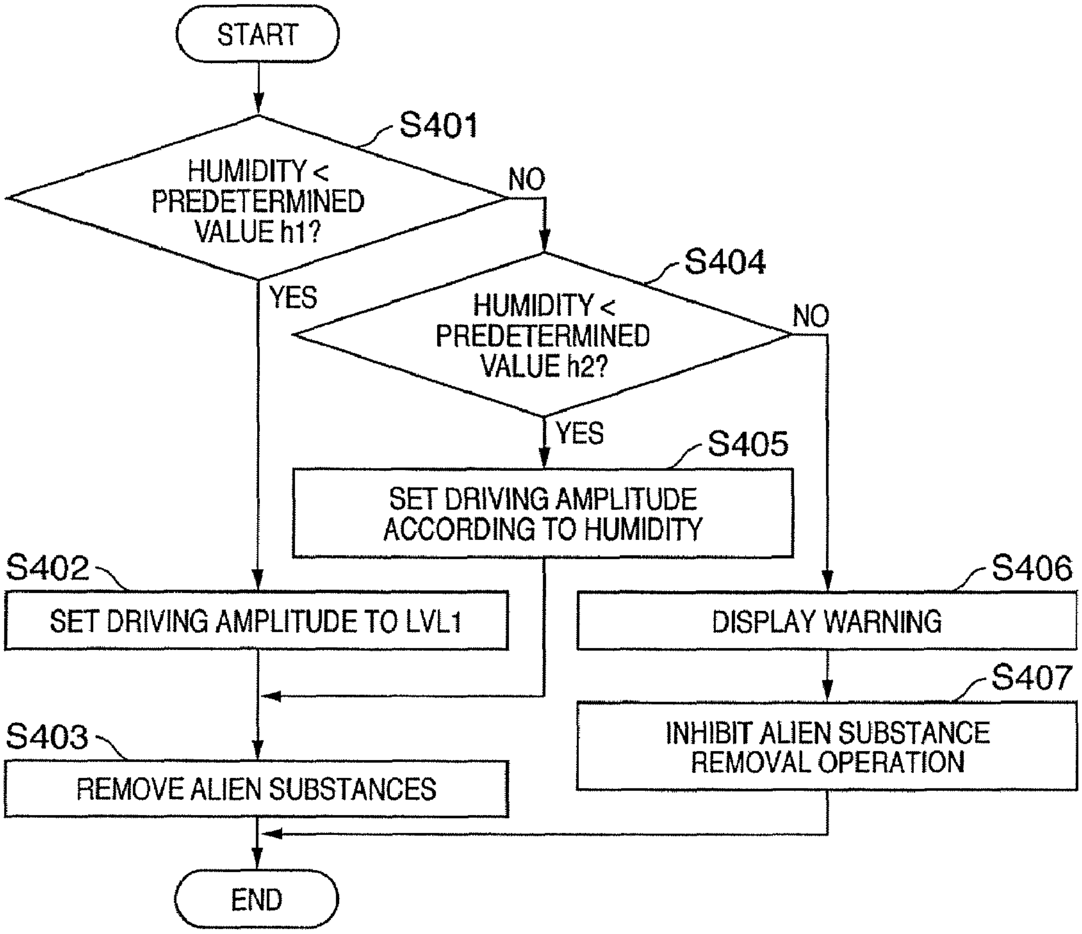
FIG. 4 is a flowchart showing the alien substance removal processing procedure executed in step S303 of FIG. 3.

FIG. 4 is a flowchart showing the alien substance removal processing procedure executed in step S303 of FIG. 3.

In this process, according to the humidity in the camera main body 2, the control unit 17 sets the amplitude of vibration to be applied to the vibration unit 12. If the humidity in the camera main body 2 is so high that the control unit 17 can hardly or cannot remove the alien substances adhering to the surface of the glass plate 11, it controls the display 10 to display a warning message indicating that the alien substances removal operation is very difficult. In addition, the control unit 17 inhibits the alien substance removal operation.

Referring to FIG. 4, the humidity sensor 15 detects the humidity in the camera main body 2 and outputs a resistance value corresponding to it. The A/D converter 16 A/D converts a voltage divided by the humidity sensor 15 and outputs, as the humidity in the camera main body 2, the resultant A/D conversion value to the control unit 17. The control unit 17 determines whether the humidity in the camera main body 2 is less than a predetermined value h1 (step S401).

Figure 5:
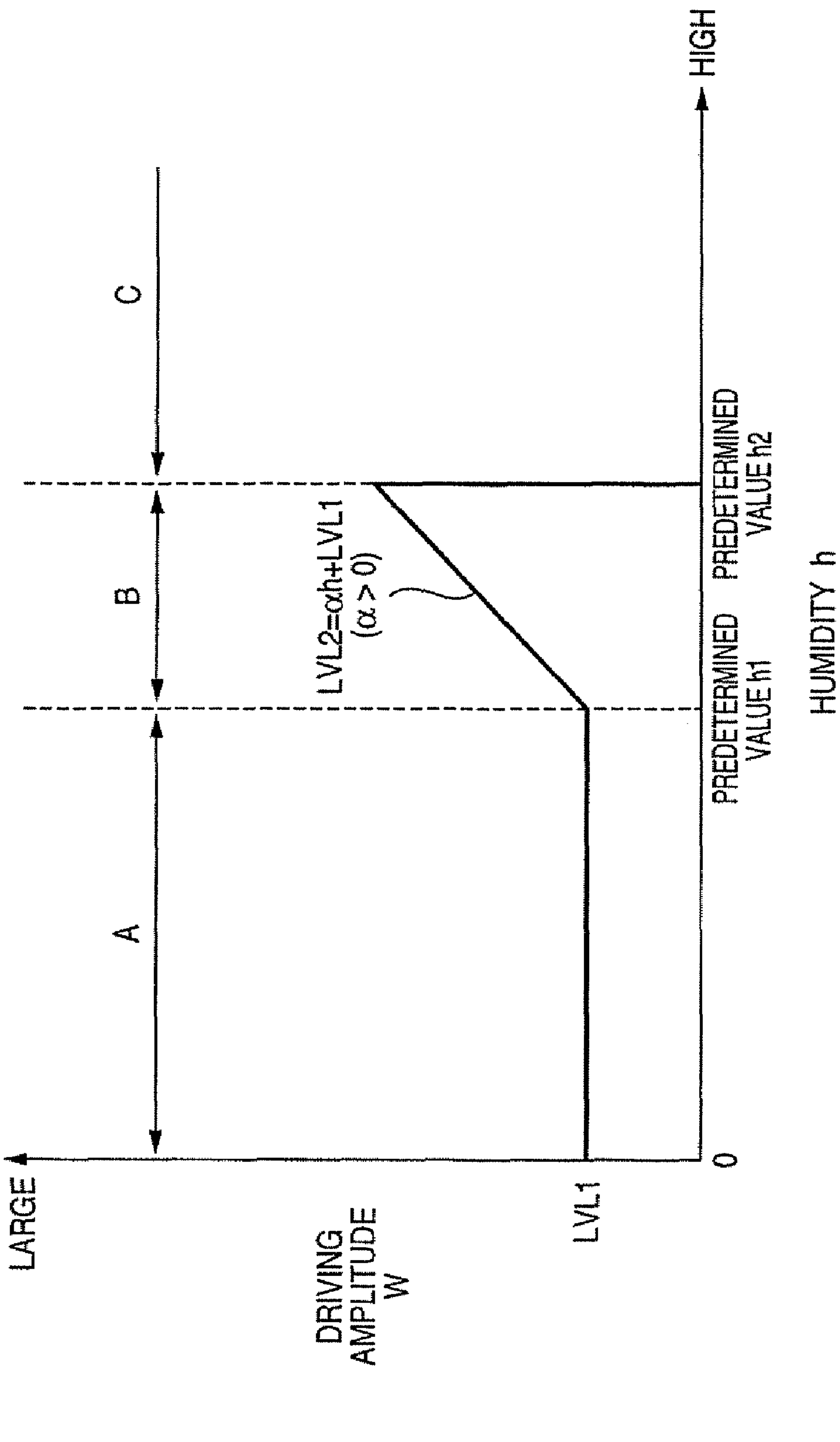
FIG. 5 is a graph showing the relationship between the humidity in the camera main body and the amplitude of vibration applied to a vibration unit.

FIG. 5 is a graph showing the relationship between the humidity in the camera main body 2 and the amplitude of vibration applied to the vibration unit 12. The abscissa represents a humidity h in the camera main body 2. The ordinate represents an amplitude w of vibration applied to the vibration unit 12. A range A indicates a range within which the humidity in the camera main body 2 is less than the predetermined value h1. A range B indicates a range within which the humidity in the camera main body 2 is the predetermined value h1 (inclusive) to a predetermined value h2 (exclusive) (h2>h1). A range C indicates a range within which the humidity in the camera main body 2 is equal to or more than the predetermined value h2.

In step S401, if the humidity in the camera main body 2 is less than the predetermined value h1, i.e., if the humidity in the camera main body 2 falls within the range A shown in FIG. 5, the procedure advances to step S402.

In step S402, the control unit 17 sets the amplitude of vibration to be applied to the vibration unit 12 to LVL1. The vibration amplitude LVL1 is large enough to remove the alien substances adhering to the surface of the glass plate 11 if the humidity in the camera main body 2 falls within the range A.

The control unit 17 controls the driving circuit 13 to vibrate the vibration unit 12 with the set vibration amplitude (in this case, LVL1) for a predetermined time, thereby removing the alien substances adhering to the surface of the glass plate 11 (step S403). This process is thus terminated.

As a result of determination in step S401, if the humidity in the camera main body 2 is equal to or more the predetermined value h1, the procedure advances to step S404. It is determined in step S404 whether the humidity in the camera main body 2 is less than the predetermined value h2.

As a result of determination in step S404, if the humidity in the camera main body 2 is less than the predetermined value h2, i.e., if the humidity in the camera main body 2 falls within the range B shown in FIG. 5, the procedure advances to step S405. In step S405, according to the humidity in the camera main body 2, the control unit 17 sets the amplitude of vibration to be applied to the vibration unit 12 to LVL2. For example, the vibration amplitude LVL2 is expressed by a value which linearly increases with respect to the humidity h from the vibration amplitude LVL1 as indicated by the following equation:

$$LVL2=\alpha h+LVL1(\alpha>0) \quad (1)$$

The vibration amplitude LVL2 is not limited to the value which linearly increases with respect to the humidity h as indicated by equation (1). The vibration amplitude LVL2 may be set to a value which nonlinearly increases.

As shown in FIG. 5, in the range B, the higher the humidity in the camera main body 2, the larger the amplitude of vibration applied to the vibration unit 12. In this case, instead of calculating the vibration amplitude by equation (1) described above, a vibration amplitude table corresponding to the humidity in the camera main body 2 may be saved in the control unit 17 in advance so as to calculate the vibration amplitude by looking up this table. Alternatively, the vibration amplitude may be calculated by performing a predetermined arithmetic operation based on vibration amplitudes corresponding to the predetermined values h1 and h2.

The control unit 17 controls the driving circuit 13 to vibrate the vibration unit 12 with the set vibration amplitude (in this case, LVL2) for a predetermined time, thereby removing the alien substances adhering to the surface of the glass plate 11 (step S403). This process is thus terminated.

As a result of determination in step S404, if the humidity in the camera main body 2 is equal to or more than the predetermined value h2, i.e., if the humidity in the camera main body 2 falls within the range C shown in FIG. 5, the procedure advances to step S406.

In this case, the predetermined value h2 is high enough to allow the surface of the glass plate 11 to be moistened so that the alien substances adhering to the surface of the glass plate 11 absorbs the moisture. Therefore, if the humidity in the camera main body 2 is equal to or more than the predetermined value h2, the humidity in the camera main body 2 is so high that the alien substances adhering to the surface of the glass plate 11 can hardly or cannot be removed.

In step S406, a warning message indicating that the alien substance removal operation is very difficult is displayed on the display 10. In step S407, the alien substance removal operation is inhibited. This process is thus terminated.

According to the first embodiment, the control unit 17 sets the amplitude of vibration to be applied to the vibration unit 12 according to the humidity in the camera main body 2 (steps S402 and S405). As a result, the alien substances adhering to the surface of the glass plate 11 can be appropriately removed in accordance with the environmental condition around the image capturing unit.

If the humidity in the camera main body 2 is so high that the control unit 17 can hardly or cannot remove the alien substances adhering to the surface of the glass plate 11, a warning message indicating that the alien substance removal operation is very difficult is displayed on the display 10 (step S406). Then, the alien substance removal operation is inhibited (step S407). As a result, it is possible to prevent an unwanted alien substance removal operation. It is also possible to prevent the user from considering by mistake that the alien substances which were adhering to the glass plate 11 has been removed and therefore from executing photography while the alien substances adhere to the glass plate 11.

In this embodiment, the humidity in the camera main body 2 is detected by the humidity sensor 15, and the alien substance removal operation is executed depending on the detected humidity. However, the present invention is not limited to this. It suffices as long as the moisture content around the image capturing unit can be detected. Instead of the humidity sensor, for example, the image capturing apparatus may comprise a condensation sensor to detect condensation around the image capturing unit. In this case, whether to vibrate the vibration unit 12 may be decided based on whether condensation has been detected around the image capturing unit.

In this embodiment, the alien substance removal process in FIG. 4 is executed at the time of activating the digital camera 100. However, the present invention is not limited to this. For example, the image capturing apparatus may execute the alien substance removal process when the user has pressed an alien substance removal switch (not shown) connected to the control unit 17.

This embodiment has been described assuming that the alien substance adhesion target is the surface of the glass plate 11 of the image capturing unit. However, the present invention is not limited to this. The present invention can be applied to other members to which alien substances are expected to adhere.

For example, a low-pass filter or infrared cut filter is arranged between the shutters 7 and the glass plate 11 in some cases. The low-pass filter is used to adjust the spatial frequency of an object image guided to the image sensor 9. The infrared cut filter is used to cut a light beam in an infrared region. In this case, alien substances which enter from outside the image capturing apparatus can adhere to the surface of the low-pass filter or infrared cut filter. This adversely affects the photographed image. Hence, the humidity sensor 15 and vibration unit 12 may be arranged on the low-pass filter or infrared cut filter.

Furthermore, as a protective film, an optical member without any specific optical function may be inserted in the object light beam path. The humidity sensor 15 and vibration unit 12 may be arranged on the optical member. Since this optical member has no specific optical function, it can be designed to have a film thickness optimal for alien substance removal.

Second Embodiment

Figure 6:
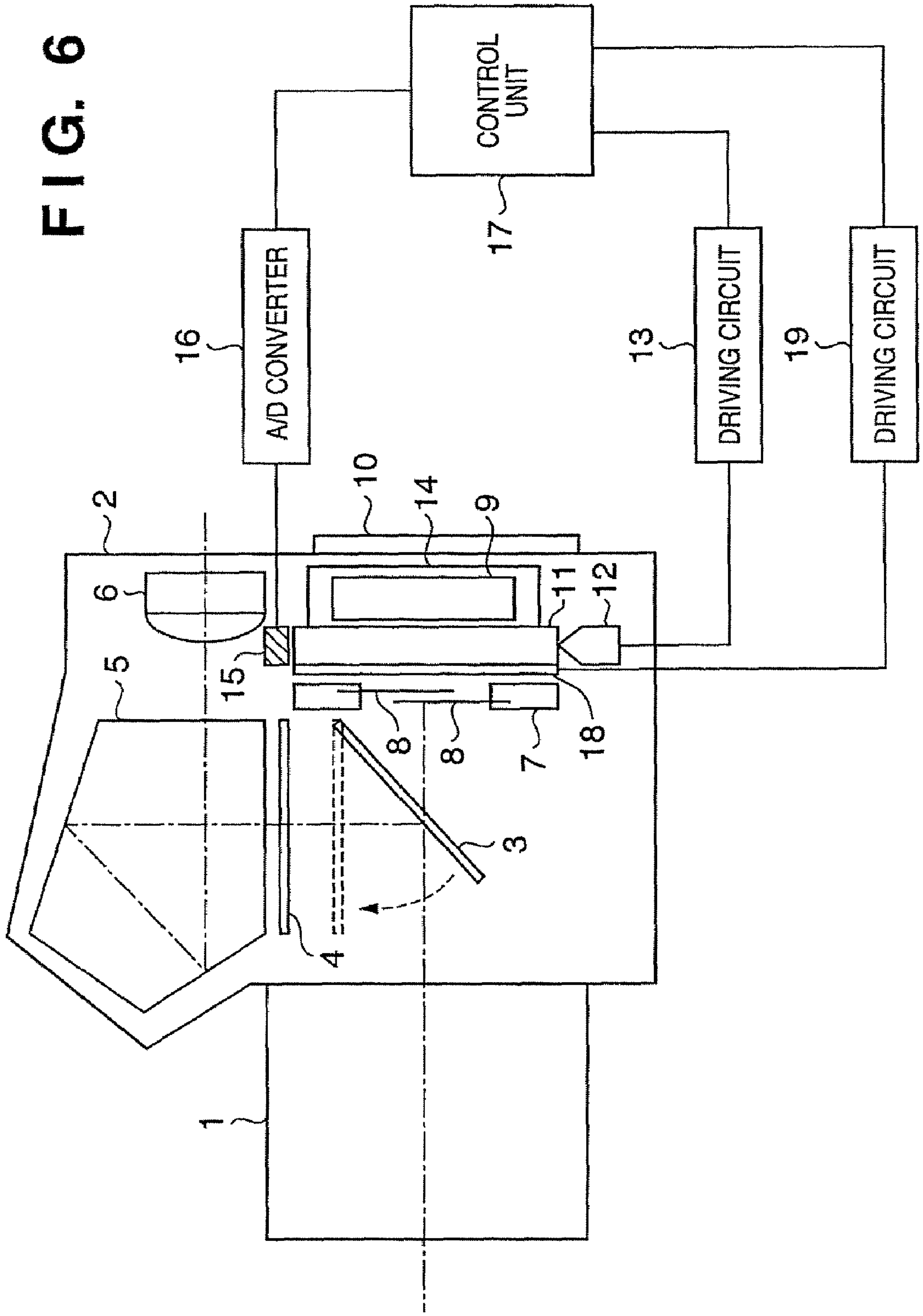
FIG. 6 is a schematic view showing the internal arrangement of an image capturing apparatus according to the preferred second embodiment of the present invention.

FIG. 6 is a schematic view showing the internal arrangement of an image capturing apparatus according to the preferred second embodiment of the present invention.

The arrangement of the image capturing apparatus in FIG. 6 is basically the same as that in FIG. 1. The same reference numerals as in FIG. 1 denote the same constituent components, and a description thereof will be omitted. The differences from FIG. 1 will be described here.

The image capturing apparatus in FIG. 6 is different from that in FIG. 1 in that it comprises a transparent conductive thin film 18 and driving circuit 19, in addition to the constituent components of the image capturing apparatus in FIG. 1.

The transparent conductive thin film 18 contains, for example, tin oxide or indium oxide as the main component. The surface of a glass plate 11 is coated with the transparent conductive thin film 18. The driving circuit 19 is controlled by a control unit 17 and is electrically connected to the transparent conductive thin film 18, thus heating the glass plate 11. This lowers the humidity in a camera main body 2.

Figure 7:
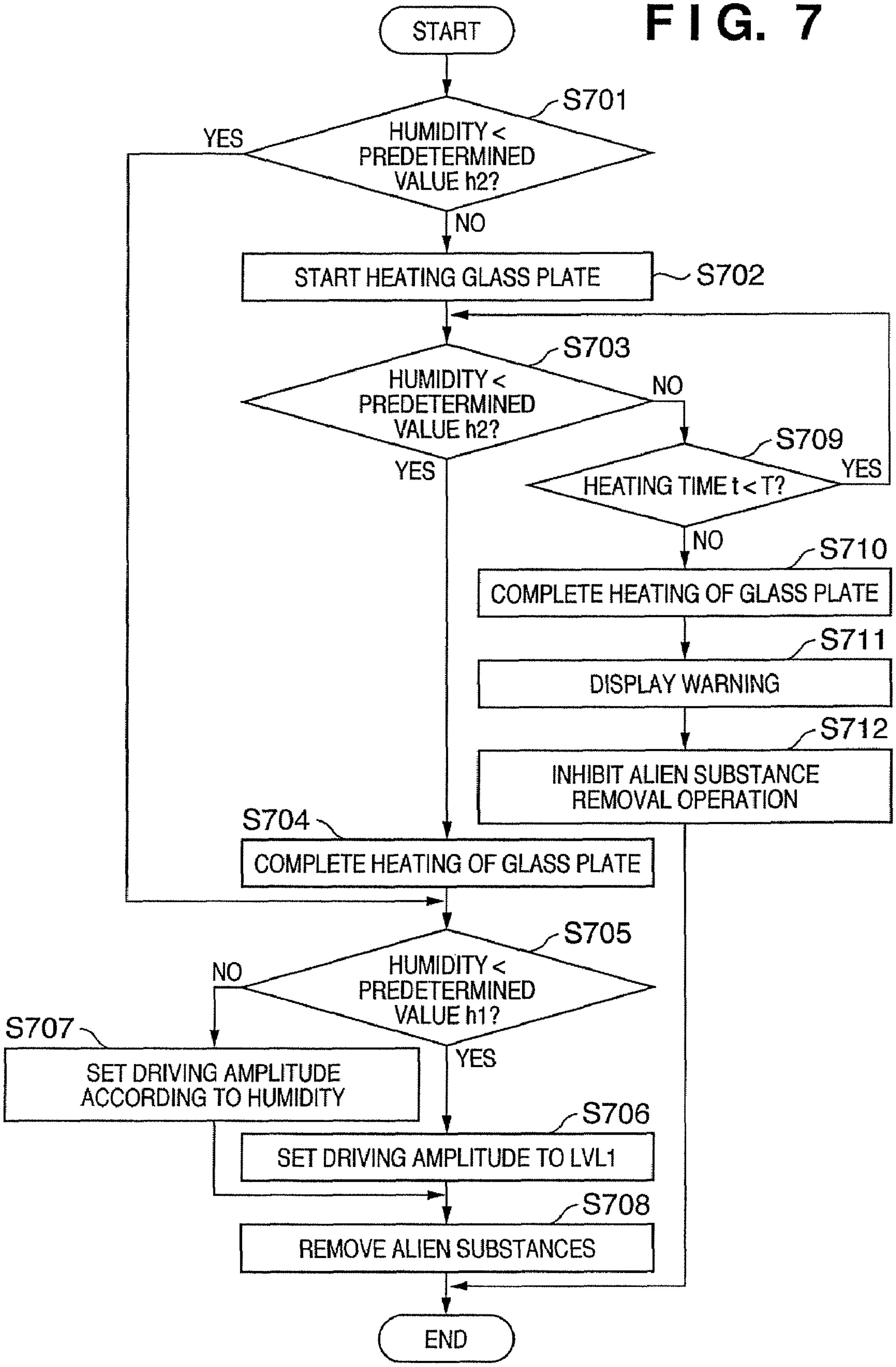
FIG. 7 is a flowchart showing the alien substance removal processing procedure executed by a control unit in FIG. 6.

FIG. 7 is a flowchart showing the alien substance removal processing procedure executed by the control unit 17 in FIG. 6.

In this process, if the humidity in the camera main body 2 is so high that the control unit 17 can hardly or cannot remove the alien substances adhering to the surface of the glass plate 11, it controls to heat the glass plate 11 so as to lower the humidity in the camera main body 2.

Referring to FIG. 7, a humidity sensor 15 detects the humidity in the camera main body 2 and outputs a resistance value corresponding to it. An A/D converter 16 A/D converts a voltage divided by the humidity sensor 15 and outputs, as the humidity in the camera main body 2, the resultant A/D conversion value to the control unit 17. The control unit 17 determines whether the humidity in the camera main body 2 is less than the above-described predetermined value h2 (step S701).

As a result of this determination, if the humidity in the camera main body 2 is equal to or more than the predetermined value h2, i.e., if the humidity in the camera main body 2 falls within a range C shown in FIG. 5, the procedure advances to step S702.

In step S702, the control unit 17 controls the driving circuit 19 to electrically connect it to the transparent conductive thin film 18, thereby starting heating the glass plate 11. At this time, when heating of the glass plate 11 starts, the control unit 17 starts counting a heating time t of the glass plate 11.

The humidity sensor 15 detects the humidity in the camera main body 2 again. The control unit 17 determines whether the humidity in the camera main body 2 is less than the predetermined value h2 (step S703). As a result of this determination, if the humidity in the camera main body 2 is equal to or more than the predetermined value h2, i.e., if the humidity in the camera main body 2 falls within the range C shown in FIG. 5, the procedure advances to step S709.

In step S709, the heating time t of the glass plate 11 counted by the control unit 17 is calculated. The procedure returns to step S703 during time counting. This amounts to determining the counted time and the humidity in the camera main body 2 while heating continues. That is, heating of the glass plate 11 continues until the humidity in the camera main body 2 becomes lower than the predetermined value h2 or the heating time t reaches a predetermined time T.

If it is found in step S709 that the counted heating time t is equal to or more than the predetermined time T, the procedure advances to step S710.

At this time, even though the glass plate 11 has been heated for the predetermined time T, the humidity in the camera main body 2 is not decreased to an extent that the alien substances adhering to the surface of the glass plate 11 can be removed. Therefore, it is difficult to decrease the humidity in the camera main body 2 even if the heating time of the glass plate 11 is prolonged.

In step S710, the control unit 17 controls the driving circuit 19 to stop energizing the transparent conductive thin film 18, thus completing heating of the glass plate 11. A warning message indicating that the alien substance removal operation is very difficult is displayed on the display 10 (step S711). The alien substance removal operation is inhibited (step S712). This process is thus terminated.

As a result of determination in step S703, if the humidity in the camera main body 2 is less than the predetermined value h2, the procedure advances to step S704. At this time, the humidity in the camera main body 2 has been decreased to an extent that the alien substances adhering to the surface of the glass plate 11 can be removed.

In step S704, the control unit 17 controls the driving circuit 19 to stop energizing the transparent conductive thin film 18, thus completing heating of the glass plate 11.

The humidity sensor 15 detects the humidity in the camera main body 2 again. The control unit 17 determines whether the humidity in the camera main body 2 is less than a predetermined value h1 (step S705). As a result of this determination, if the humidity in the camera main body 2 is less than the predetermined value h1, i.e., if the humidity in the camera main body 2 falls within a range A shown in FIG. 5, the procedure advances to step S706.

In step S706, the control unit 17 sets the amplitude of vibration to be applied to a vibration unit 12 to LVL1. The control unit 17 controls a driving circuit 13 to vibrate the vibration unit 12 with the set vibration amplitude (in this case, LVL1) for a predetermined time, thereby removing the alien substances adhering to the surface of the glass plate 11 (step S708). This process is thus terminated.

As a result of determination in step S705, if the humidity in the camera main body 2 is equal to or more than the predetermined value h1, i.e., if the humidity in the camera main body 2 falls within a range B shown in FIG. 5, the procedure advances to step S707. In step S707, according to the humidity in the camera main body 2, the control unit 17 sets the amplitude of vibration to be applied to the vibration unit 12 to LVL2 described above.

The control unit 17 controls the driving circuit 13 to vibrate the vibration unit 12 with the set vibration amplitude (in this case, LVL2) for a predetermined time, thereby removing the alien substances adhering to the surface of the glass plate 11 (step S708). This process is thus terminated.

As a result of determination in step S701, if the humidity in the camera main body 2 is less than the predetermined value h2, the humidity in the camera main body 2 is low enough to remove the alien substances adhering to the surface of the glass plate 11. The processes subsequent to step S705 are executed.

According to the second embodiment, if the humidity in the camera main body 2 is so high that the control unit 17 can hardly or cannot remove the alien substances adhering to the surface of the glass plate 11, it controls to heat the glass plate 11 so as to lower the humidity in the camera main body 2 (step S702). As a result, the alien substances adhering to the surface of the glass plate 11 can be appropriately removed in accordance with the environmental condition around the image capturing unit.

This embodiment has been described assuming that the alien substance adhesion target is the surface of the glass plate 11 of the image capturing unit. However, the present invention is not limited to this. The present invention can be applied to other members to which alien substances are expected to adhere. For example, a low-pass filter or infrared cut filter is arranged between shutters 7 and the glass plate 11 in some cases. The low-pass filter is used to adjust the spatial frequency of an object image guided to an image sensor 9. The infrared cut filter is used to cut a light beam in an infrared region. In this case, alien substances which enter from outside the image capturing apparatus can adhere to the surface of the low-pass filter or infrared cut filter. This adversely affects the photographed image. Hence, the humidity sensor 15 and vibration unit 12 may be arranged on the low-pass filter or infrared cut filter.

Furthermore, as a protective film, an optical member without any specific optical function may be inserted in the object light beam path. The humidity sensor 15 and vibration unit 12 may be arranged on the optical member. Since this optical member has no specific optical function, it can be designed to have a film thickness optimal for alien substance removal.

The object of the present invention is achieved even by the following method. That is, a computer-readable storage medium which records software program codes to implement the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-235948, filed on Aug. 16, 2005, which is hereby incorporated by reference herein in its entirety.

What is claimed is:

1. An image capturing apparatus including an image capturing unit which converts an optical image of an object into an electrical signal, and an optical member arranged on the object side of the image capturing unit, comprising:

a vibration unit configured to vibrate the image capturing unit or the optical member at a predetermined vibration amplitude to remove an alien substance;

humidity detection unit configured to detect humidity around the image capturing unit or around the optical member; and a control unit configured to control the predetermined vibration amplitude of the vibration unit, the control unit sets the predetermined vibration amplitude to a first vibration amplitude if the humidity around the image capturing unit or around the optical member is lower than a first predetermined value, and sets the predetermined vibration amplitude to a second vibration amplitude if the humidity around the image capturing unit or around the optical member is greater than or equal to the first predetermined value but less than a second predetermined value.

2. The apparatus according to claim 1, further comprising a warning unit configured to warn an apparatus user if the detected humidity is not less than the second predetermined value.

3. The apparatus according to claim 1, further comprising a heating unit configured to heat the surface of the image capturing unit or the surface of the optical member.

4. The apparatus according to claim 3, wherein said control unit controls said heating unit to start heating if the detected humidity is not less than the second predetermined value.

5. The apparatus according to claim 4, wherein said control unit controls said heating unit to stop heating if the detected humidity has become lower than the second predetermined value after controlling said heating unit to start heating.

6. The apparatus according to claim 4, wherein said control unit controls said heating unit to stop heating if the detected humidity does not become lower than the second predetermined value within a predetermined time after controlling said heating unit to start heating.

7. The apparatus according to claim 1, wherein said control unit inhibits the vibration of said vibration unit if the detected humidity is not less than the second predetermined value.

8. A method of controlling an image capturing apparatus including an image capturing unit which converts an optical image of an object into an electrical signal, and an optical member arranged on the object side of the image capturing unit, comprising:

a vibration step of vibrating the image capturing unit or the optical member at a predetermined vibration amplitude to remove an alien substances;

humidity detection step of detecting humidity around the image capturing unit or around the optical member; and a control step of controlling the predetermined vibration amplitude of the vibration step, the control step sets the predetermined vibration amplitude to a first vibration amplitude if the humidity around the image capturing unit or around the optical member is lower than a first predetermined value, and sets the predetermined vibration amplitude to a second vibration amplitude if the humidity around the image capturing unit or around the optical member is greater than or equal to the first predetermined value but less than a second predetermined value.

9. A program stored in a computer-readable storage medium, which can be executed by an image capturing apparatus including an image capturing unit which converts an optical image of an object into an electrical signal, and an optical member arranged on the object side of the image capturing unit, comprising program codes for:

vibrating the image capturing unit or the optical member at a predetermined vibration amplitude to remove an alien substance;

detecting humidity around the image capturing unit or around the optical member; and controlling the predetermined vibration amplitude of the vibration step, the control step sets the predetermined vibration amplitude to a first vibration amplitude if the humidity around the image capturing unit or around the optical member is lower than a first predetermined value, and sets the predetermined vibration amplitude to a second vibration amplitude if the humidity around the image capturing unit or around the optical member is greater than or equal to the first predetermined value but less than a second predetermined value.

* * * * *